(12) United States Patent
Iwamura et al.

(10) Patent No.: US 8,504,049 B2
(45) Date of Patent: Aug. 6, 2013

(54) MOBILE COMMUNICATION SYSTEM, BASE STATION, ACCESS GATEWAY, AND TRACKING AREA SETTING METHOD

(75) Inventors: Mikio Iwamura, Yokohama (JP); Takehiro Nakamura, Yokohama (JP); Yasuhiro Kato, Yokohama (JP); Wuri Andarmawanti Hapsari, Yokosuka (JP)

(73) Assignee: NTT DoCoMo, Inc., Tokyo (JP)

(*) Notice: Subject to any disclaimer, the term of this patent is extended or adjusted under 35 U.S.C. 154(b) by 706 days.

(21) Appl. No.: 12/524,732

(22) PCT Filed: Jan. 30, 2008

(86) PCT No.: PCT/JP2008/051439
§ 371 (c)(1),
(2), (4) Date: Sep. 28, 2009

(87) PCT Pub. No.: WO2008/093744
PCT Pub. Date: Aug. 7, 2008

(65) Prior Publication Data
US 2010/0048141 A1    Feb. 25, 2010

(30) Foreign Application Priority Data
Feb. 2, 2007 (JP) ................................. 2007-024895

(51) Int. Cl.
*H04W 40/00* (2009.01)
*H04B 17/00* (2006.01)

(52) U.S. Cl.
USPC ........................................ 455/446; 455/67.11

(58) Field of Classification Search
USPC ................................. 455/446, 449, 67.11, 444
See application file for complete search history.

(56) References Cited

U.S. PATENT DOCUMENTS 7,158,790 B1 * 1/2007 Elliott ........................... 455/446
2003/0109254 A1 * 6/2003 Motegi et al. ................ 455/435

FOREIGN PATENT DOCUMENTS

| JP | 11-215552 A | 8/1999 |
| JP | 2003-174665 A | 6/2003 |
| JP | 2006-140829 A | 6/2006 |

OTHER PUBLICATIONS

International Search Report w/translation from PCT/JP2008/051439 dated Apr. 1, 2008 (4 pages).
Written Opinion from PCT/JP2008/051439 dated Apr. 1, 2008 (4 pages).
3GPP TR 25.814 V7.0.0; "3rd Generation Partnership Project; Technical Specification Group Radio Access Network; Physical Layer Aspects for Evolved Universal Terrrestrial Radio Access (UTRA)"; Jun. 2006 (126 pages).

(Continued)

*Primary Examiner* — Melody Mehrpour
*Assistant Examiner* — Emem Stephen
(74) *Attorney, Agent, or Firm* — Osha Liang LLP

(57) ABSTRACT

A disclosed mobile communication system includes a newly-installed base station configured to send its identifier and a pilot channel; existing base stations; user devices configured to send reception quality measurements of the pilot channel to the existing base stations; and an upper node. Each of the existing base stations includes a statistical processing unit for performing statistical processing on the reception quality measurements; and a statistical processing result reporting unit configured to send a result of the statistical processing to the upper node. The upper node includes a tracking area selecting unit configured to select a tracking area to be assigned to the newly-installed base station based on the results of the statistical processing; and a tracking area reporting unit configured to report the selected tracking area to the newly-installed base station. The newly-installed base station includes a tracking area setting unit configured to set the reported tracking area.

12 Claims, 7 Drawing Sheets

(56) References Cited

OTHER PUBLICATIONS

Tachikawa, K.; "W-CDMA Mobile Communication System"; Maruzen, 20001; pp. 197-199 (7 pages).
3GPP TS 23.122 V7.7.0; "3rd Generation Partnership Project; Technical Specification Group Core Network and Terminals; Non-Access-Stratum (NAS) Functions Related to Mobile Station (MS) in Idle Mode"; Dec. 2006 (34 pages).
3GPP TSG RAN WG2 Ad Hoc on LTE; R2-061929; "Standardisation Policy for Plug and Play RAN"; Jun. 27-30, 2006; (4 pages).

* cited by examiner

MOBILE COMMUNICATION SYSTEM, BASE STATION, ACCESS GATEWAY, AND TRACKING AREA SETTING METHOD

TECHNICAL FIELD

The present invention generally relates to a Long Term Evolution (LTE) system. More particularly, the present invention relates to a mobile communication system, a base station, an access gateway, and a tracking area setting method.

BACKGROUND ART

A successor communication system to W-CDMA and HSDPA (collectively called UMTS), i.e., Long Term Evolution (LTE), is currently being discussed by 3GPP that is a standardization group for UMTS. In LTE, orthogonal frequency division multiplexing (OFDM) is to be used as a downlink radio access method and single-carrier frequency division multiple access (SC-FDMA) is to be used as an uplink radio access method (see, for example, 3GPP TR 25.814 (V7.0.0), "Physical Layer Aspects for Evolved UTRA," June 2006).

In UMTS, when a new cell is to be introduced, the location of a base station, antenna parameters, radio parameters, and so on are simulated using, for example, a simulation tool and link budgets (see, for example, W-CDMA Mobile Communication System, pp. 197-199, Keiji Tachikawa, Maruzen, 2001). Then, a new base station is installed based on the simulation results. Before its actual operation is started, a test operation of the new base station is performed by transmitting pilot channels. The administrator measures radio signals transmitted from the new base station with a radio signal measuring device and adjusts the radio parameters based on the results. The radio signal measuring device is mounted on a dedicated vehicle which is driven along roads in a target area to measure the radio signals.

In a mobile communication network, the location of a user device in the idle mode is registered in the network based on tracking areas. A tracking area corresponds to a location area (LA) or a routing area (RA) in UMTS and is composed of one or more cells.

In UMTS, when a new cell is to be introduced, the tracking area of the new cell is simulated by, for example, estimating the frequency of updating the tracking area based on the population distribution in an area where the new cell is to be introduced.

DISCLOSURE OF INVENTION

Problems to be Solved by the Invention

However, the above background art technologies have problems as described below.

For example, designing and operating a new base station require a huge workload particularly to perform the simulation and the measurement of radio wave propagation conditions and thereby to optimize the antenna and radio parameters and the tracking area. In 3GPP, to reduce the workload, a mechanism for automatically configuring a new base station in an LTE system has been proposed. In the proposed mechanism, a new base station is connected via a cable to a network and is automatically configured when it is turned on (see, for example, 3GPP R2-061929, June 2006). Since it is expected that a large number of small base stations such as home-use base stations will be introduced to meet future communication demands, implementation of such an automatic configuration mechanism is desired.

However, this proposal is still just a concept and specific configurations of a base station and a user device have not been proposed yet.

When a base station is newly installed, it is necessary to configure radio parameters based on the reception quality, at various locations, of radio signals transmitted from the newly-installed base station.

Also, when a new cell is introduced, it is necessary to automatically set a tracking area of the new cell.

One object of the present invention is to solve or reduce one or more of the above problems and to provide a mobile communication system, a base station, an access gateway, and a tracking area setting method that make it possible to automatically set a tracking area of a newly-installed base station.

Means for Solving the Problems

An aspect of the present invention provides a mobile communication system including a newly-installed base station configured to send an identifier of the newly-installed base station and a pilot channel; one or more existing base stations; one or more user devices configured to send reception quality measurements of the pilot channel to the corresponding existing base stations; and an upper node. Each of the existing base stations includes a statistical processing unit configured to perform statistical processing on the reception quality measurements sent from the corresponding user devices and a statistical processing result reporting unit configured to send a result of the statistical processing to the upper node. The upper node includes a tracking area selecting unit configured to select a tracking area to be assigned to the newly-installed base station based on the results of the statistical processing sent from the existing base stations and a tracking area reporting unit configured to send information indicating the tracking area selected by the tracking area selecting unit to the newly-installed base station. The newly-installed base station includes a tracking area setting unit configured to set the tracking area of the newly-installed base station based on the information indicating the tracking area sent from the upper node.

This configuration makes it possible to determine a tracking area for a newly-installed base station based on reception quality measurements of a pilot channel sent from the newly-installed base station.

Another aspect of the present invention provides a mobile communication system including a newly-installed base station configured to send an identifier of the newly-installed base station and a pilot channel; one or more existing base stations; one or more user devices configured to measure reception quality of the pilot channel; and an upper node. Each of the user devices includes a determining unit configured to determine whether the reception quality measurement of the pilot channel is greater than or equal to a predetermined threshold and a reporting unit configured, if the determining unit determines that the reception quality measurement of the pilot channel is greater than or equal to the threshold, to send information indicating that the reception quality measurement is greater than or equal to the threshold to a corresponding one of the existing base stations. Each of the existing base stations includes a totaling unit configured to count a total number of the user devices reporting the information indicating that the reception quality measurement is greater than or equal to the threshold and a total number reporting unit configured to send the total number of the user devices counted by the totaling unit to the upper node. The upper node includes a tracking area selecting unit configured to select a tracking area to be assigned to the newly-installed base station based on the total numbers of the user devices sent from the existing base stations and a tracking area reporting unit configured to send information indicating the tracking area selected by the tracking area selecting unit to the newly-installed base station. The newly-installed base station includes a tracking area setting unit configured to set the tracking area of the newly-installed base station based on the information indicating the tracking area sent from the upper node.

This configuration makes it possible to determine a tracking area for a newly-installed base station based on a pilot channel sent from the newly-installed base station while eliminating the need for user devices to report reception quality measurements of the pilot channel.

Another aspect of the present invention provides a base station in a system where a newly-installed base station sends an identifier of the newly-installed base station and a pilot channel and user devices report reception quality measurements of the pilot channel. The base station includes a statistical processing unit configured to perform statistical processing on the reception quality measurements reported by the user devices; and a statistical processing result reporting unit configured to send a result of the statistical processing to an upper node.

This configuration enables a base station to perform statistical processing on reception quality measurements of a pilot channel sent from a newly-installed base station and to report the result of the statistical processing to an upper node.

Another aspect of the present invention provides an access gateway in a system including a newly-installed base station configured to send an identifier of the newly-installed base station and a pilot channel and user devices configured to send reception quality measurements of the pilot channel to existing base stations. Each of the existing base stations is configured to perform statistical processing on the reception quality measurements sent from the corresponding user devices and to send a result of the statistical processing to the access gateway. The access gateway includes a tracking area selecting unit configured to select a tracking area to be assigned to the newly-installed base station based on the results of the statistical processing sent from the existing base stations; and a tracking area reporting unit configured to send information indicating the tracking area selected by the tracking area selecting unit to the newly-installed base station.

This configuration makes it possible to determine and report a tracking area to be assigned to a newly-installed base station based on results of statistical processing performed by existing base stations on reception quality measurements of a pilot channel sent from the newly-installed base station.

According to still another aspect of the present invention, a tracking area setting method includes a transmitting step, performed by a newly-installed base station, of sending an identifier of the newly-installed base station and a pilot channel; a reporting step, performed by user devices, of sending the identifier of the newly-installed base station and reception quality measurements of the pilot channel to existing base stations; a statistical processing step, performed by the existing base stations, of performing statistical processing on the reception quality measurements sent from the corresponding user devices; a statistical processing result reporting step, performed by the existing base stations, of sending results of the statistical processing to an upper node; a tracking area selecting step, performed by the upper node, of selecting a tracking area to be assigned to the newly-installed base station based on the results of the statistical processing sent from the existing base stations; a tracking area reporting step, performed by the upper node, of sending information indicating the tracking area selected in the tracking area selecting step to the newly-installed base station; and a tracking area setting step, performed by the newly-installed base station, of setting the tracking area of the newly-installed base station based on the information indicating the tracking area sent from the upper node.

This method makes it possible to determine a tracking area for a newly-installed base station based on reception quality measurements of a pilot channel sent from the newly-installed base station.

ADVANTAGEOUS EFFECT OF THE INVENTION

An aspect of the present invention provides a mobile communication system, a base station, an access gateway, and a tracking area setting method that make it possible to automatically set a tracking area of a newly-installed base station.

EXPLANATION OF REFERENCES

Figure 1:
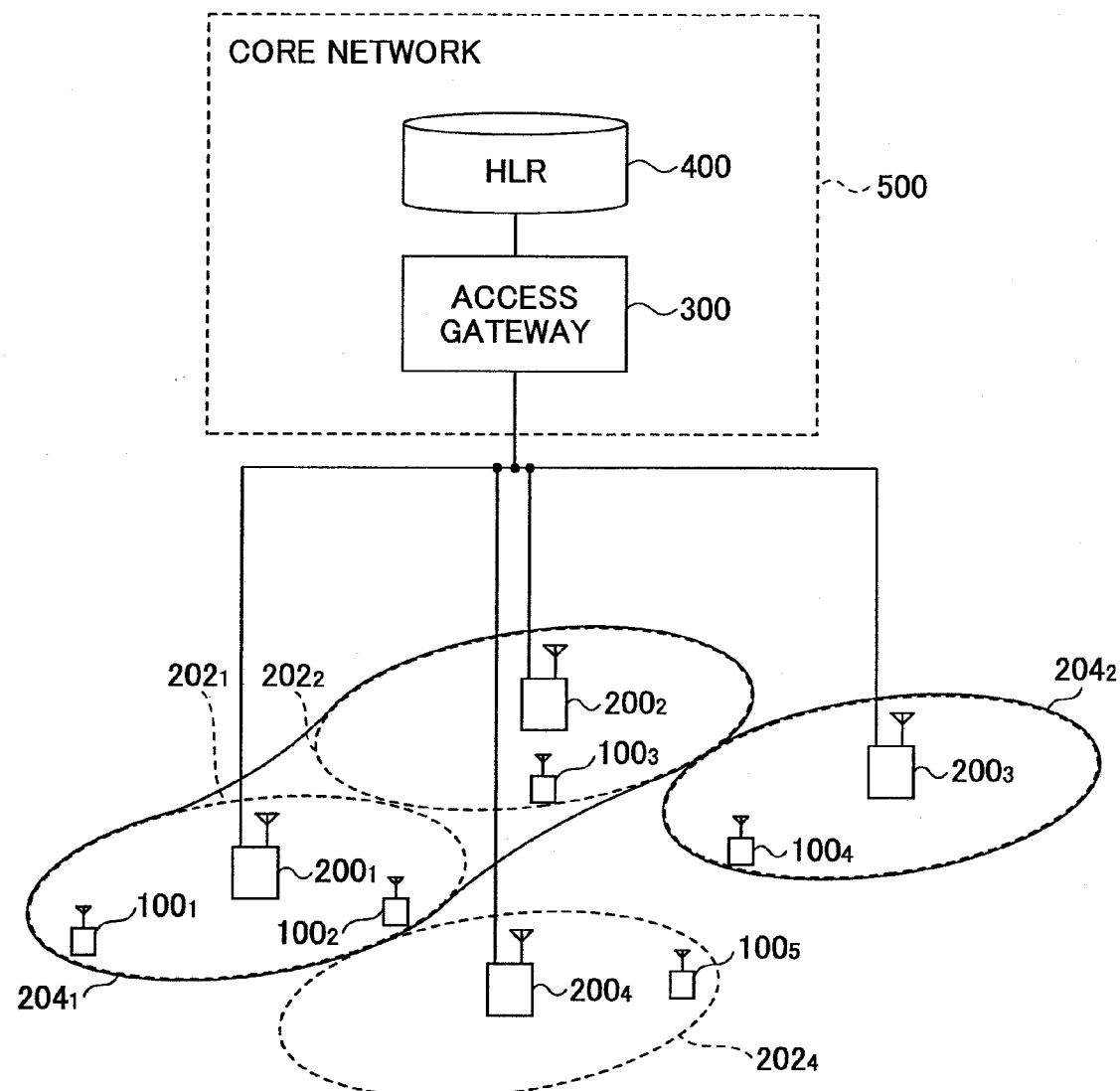
FIG. 1 is a drawing illustrating an exemplary mobile communication system according to an embodiment of the present invention.

100, $100_1$, $100_2$, $100_3$, $100_4$, $100_5$ User device
100 Tracking area setting device
102 Cell search unit
104 Broadcast channel receiving unit
106 Control unit
108 Reception quality measuring unit
110 Reporting unit
112 Cell selection unit
200, $200_1$, $200_2$, $200_3$, $200_4$ Base station
202, $202_1$, $202_2$, $202_3$, $202_4$ Cell
204, $204_1$, $204_2$ Tracking area
206 RF transmission unit
208 Broadcast channel generating unit
210 State setting unit
212 RF reception unit
214 RRC protocol processing unit
216 Statistical processing unit
218, 302 Network interface
220 Tracking area setting unit
300 Access gateway (aGW)
304 Tracking area selecting unit
306 Storage unit
400 Home location register (HLR)
500 Core network

BEST MODE FOR CARRYING OUT THE INVENTION

The best mode for carrying out the invention is described based on the following embodiments with reference to the accompanying drawings.

Throughout the accompanying drawings, the same reference numbers are used for parts having the same functions, and overlapping descriptions of those parts are omitted.

A mobile communication system according to an embodiment of the present invention is described below with reference to FIG. 1.

The mobile communication system of this embodiment is based on, for example, Evolved UTRA and UTRAN (also called Long Term Evolution or Super 3G).

The mobile communication system includes base stations (eNode B: eNB) $200_m$ (m is an integer greater than 1) and user devices (user equipment: UE) $100_n$ (n is an integer greater than 0). In the example of FIG. 1, the mobile communication system includes base stations $200_1$, $200_2$, $200_3$, and $200_4$ and user devices $100_1$, $100_2$, $100_3$, $100_4$, and $100_5$. In this embodiment, it is assumed that the base stations $200_1$, $200_2$, and $200_3$ have already been installed and the base station $200_4$ is to be newly installed near the base stations $200_1$, $200_2$, and $200_3$. In the descriptions below, the base stations $200_1$, $200_2$, and $200_3$ may be called existing base stations and the base station $200_4$ may be called a newly-installed base station.

The base stations $200_1$, $200_2$, $200_3$, and $200_4$ cover cells $202_1$, $202_2$, $202_3$, and $202_4$, respectively. In this embodiment, it is also assumed that the cells $202_1$ and $202_2$ constitute a tracking area $204_1$ and the cell $202_3$ constitutes a tracking area $204_2$. Cells constituting each tracking area may be changed as necessary. In FIG. 1, the cell $202_3$ is not indicated since the cell $202_3$ equals the tracking area $204_2$.

An access gateway (aGW) 300 is provided, for example, in a core network 500. The access gateway 300 may be provided in a network other than the core network 500. Also, the access gateway 300 may be divided into a control plane (C-plane) logical entity and a user plane (U-plane) logical entity: a mobility management entity (MME) and a user plane entity (UPE). A home location register (HLR) 400 is also provided in the core network 500. The home location register 400 stores the identifier of the access gateway 300 managing the user devices $100_n$.

The base station 200 (generally refers to any one of the base stations $200_m$) of this embodiment is described below.

In this embodiment, a set of functions for a newly-installed base station and a set of functions for an existing base station are described separately. However, the base station 200 includes both sets of functions.

Figure 2:
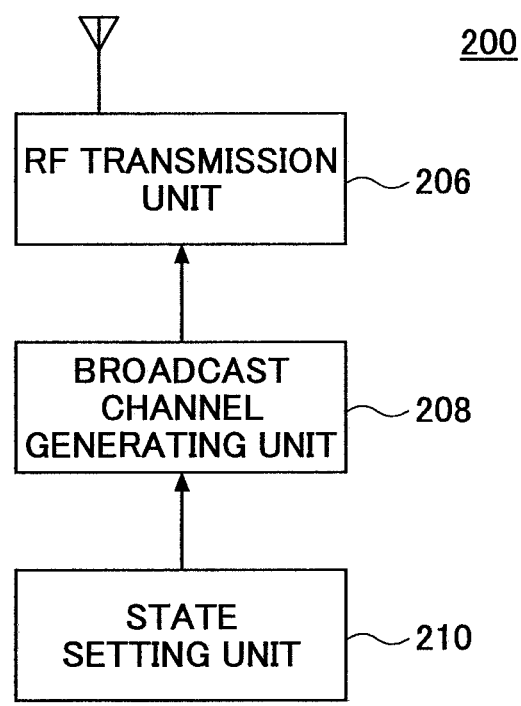
FIG. 2 is a partial block diagram of a base station according to an embodiment of the present invention.

The base station $200_4$, which is a newly installed base station and is in a pre-operation state, is described below with reference to FIG. 2. The base station $200_4$ broadcasts an indicator indicating that the base station $200_4$ is in the pre-operation state.

The pre-operation state refers to where the actual operation of a newly-installed base station has not been started yet. The base station $200_4$ is turned on, for example, after being connected to a network via a cable. Assuming that the base station $200_4$ is connected to an IP network, processes such as IP address determination, server detection, authentication, association with an upper node, and activation of programs are performed. After those processes, the base station $200_4$ (newly-installed base station) can transmit reference symbols (pilot signal), a synchronization channel, and a minimum set of broadcast information. At this stage, however, the newly-installed base station still cannot provide any communication service for users. This is called the pre-operation state. Accordingly, when the base station $200_4$ is in the pre-operation state, the user devices $100_n$ cannot enter the idle mode in the cell of the base station $200_4$ and cannot access the cell of the base station $200_4$.

The base station $200_4$ includes an RF transmission unit 206, a broadcast channel generating unit 208, and a state setting unit 210.

The state setting unit 210 sets the base station $200_4$, for example, in an in-operation state or the pre-operation state. For example, if the base station $200_4$ is a newly-installed base station, the state setting unit 210 sets an indicator indicating that the base station $200_4$ is in the pre-operation state and inputs the indicator to the broadcast channel generating unit 208.

The broadcast channel generating unit 208 generates a broadcast channel including the indicator indicating the pre-operation state, which is, for example, represented by one bit, and sends the broadcast channel via the RF transmission unit 206. The broadcast channel may also include an identifier of the newly-installed base station.

Figure 3:
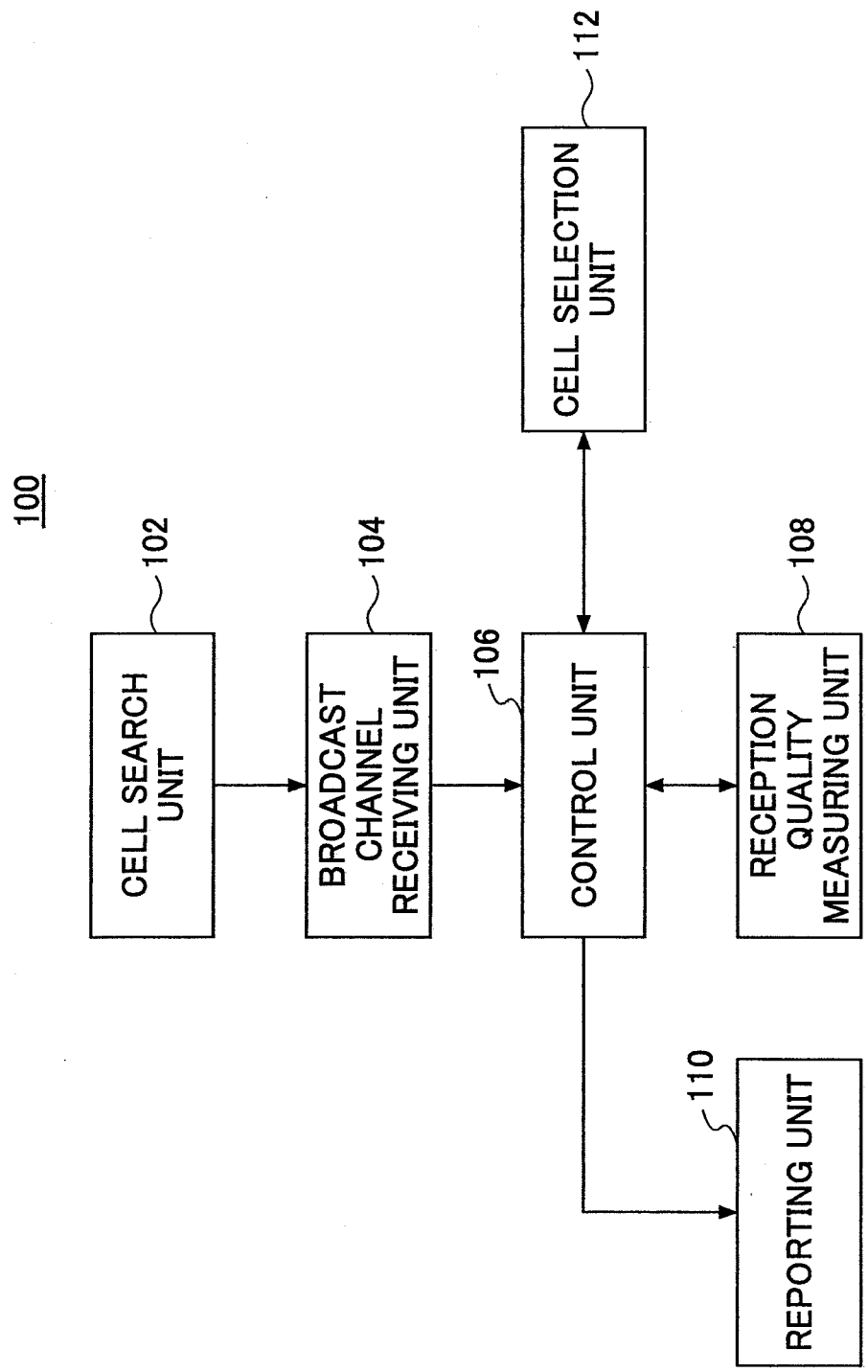
FIG. 3 is a partial block diagram of a user device according to an embodiment of the present invention.

Next, the user device 100 (generally refers to any one of the user devices $100_n$) of this embodiment is described with reference to FIG. 3.

When receiving a broadcast channel from the base station 200, the user device 100 determines whether the broadcast channel includes an indicator indicating the pre-operation state. If the broadcast channel includes the indicator indicating the pre-operation state, the user device 100 measures the reception quality, such as an SIR, of a pilot channel sent from the base station 200 (i.e., newly-installed base station) and reports the measured reception quality to the network. For example, the user device 100 sends a reception quality measurement of a pilot channel sent from the newly-installed base station $200_4$ to an existing base station, e.g., a base station covering a serving area where the user device 100 is present.

The user device 100 includes a cell search unit 102, a broadcast channel receiving unit 104, a control unit 106, a reception quality measuring unit 108, a reporting unit 110, and a cell selection unit 112.

The cell search unit 102 performs a cell search at predetermined intervals, for example, every 200 ms. If a new cell is found, the cell search unit 102 detects a transmission band of a broadcast channel based on a received synchronization channel and inputs the detected transmission band to the broadcast channel receiving unit 104.

The broadcast channel receiving unit 104 receives a broadcast channel based on the transmission band input from the cell search unit 102 and inputs broadcast information to the control unit 106.

The control unit 106 determines whether an indicator indicating the pre-operation state is included in the broadcast information input from the broadcast channel receiving unit 104. If an indicator indicating the pre-operation state is included in the broadcast information, the control unit 106 requests the reception quality measuring unit 108 to measure the reception quality such as an SIR of a pilot channel to be transmitted from the newly-installed base station $200_4$ that has sent the broadcast channel. Then, the control unit 106 reports the reception quality, measured by the reception quality measuring unit 108, of the pilot channel sent from the newly-installed base station $200_4$ to the existing base station via the reporting unit 110. The control unit 106 also reports an identifier (ID) of the newly-installed base station $200_4$ (new cell) to the existing base station. This configuration makes it possible to automatically collect information on propagation conditions of radio signals transmitted from the newly-installed base station $200_4$.

If the indicator indicating the pre-operation state is not included in the broadcast information, the control unit 106 requests the reception quality measuring unit 108 to measure the reception quality such as an SIR of a pilot channel to be transmitted from an existing base station that has sent the broadcast channel. Then, the control unit 106 inputs the reception quality measurement, measured by the reception quality measuring unit 108, of the pilot channel sent from the existing base station to the cell selection unit 112. The cell selection unit 112 performs cell selection by, for example, comparing the input reception quality measurement with the reception level of the serving cell.

Figure 4:
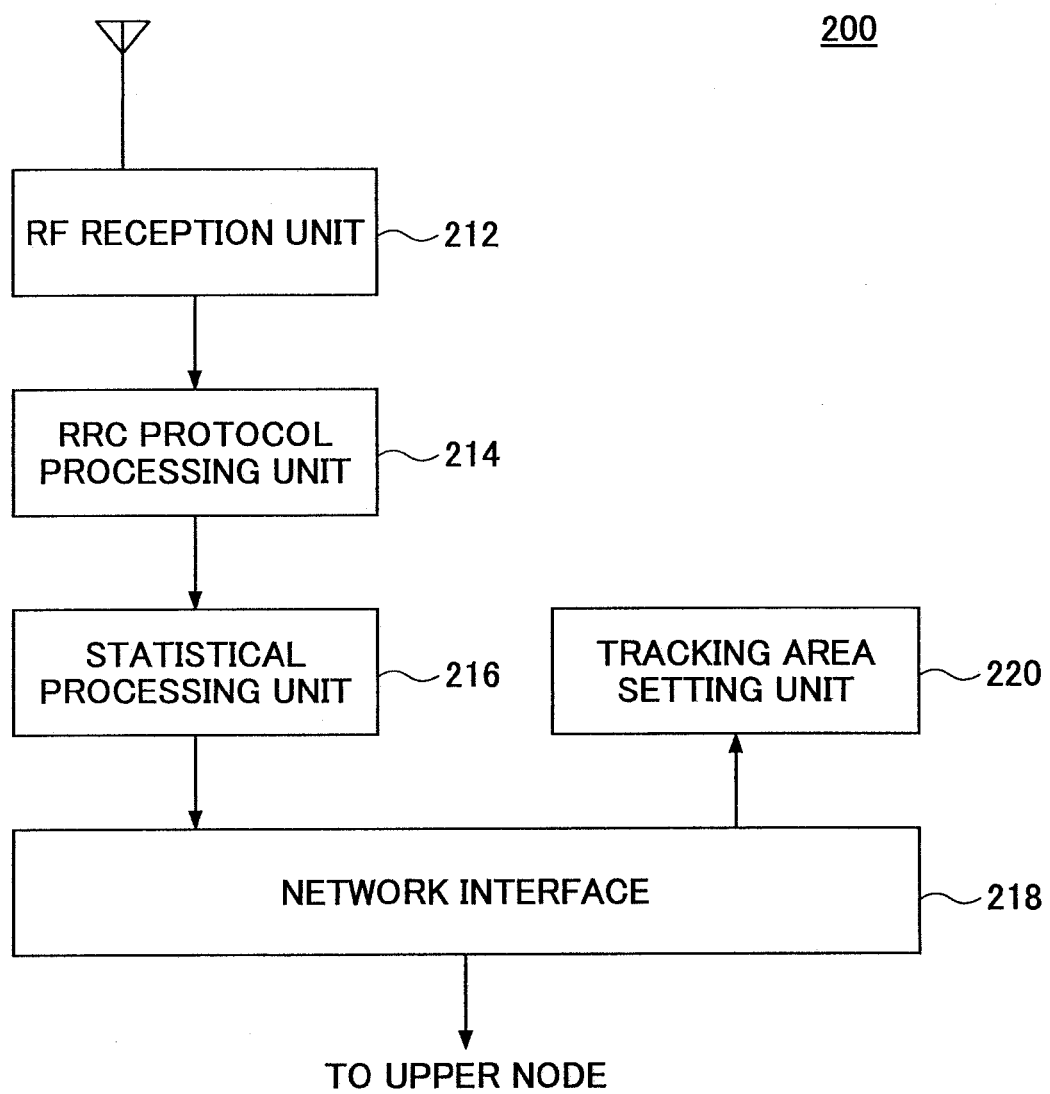
FIG. 4 is a partial block diagram of a base station according to an embodiment of the present invention.

The existing base stations $200_1$, $200_2$, and $200_3$ (hereafter called the existing base station 200) that are in actual operation are described below with reference to FIG. 4.

The existing base station 200 receives the identifier of a newly-installed base station (the base station $200_4$) and reception quality measurements such as SIRs of a pilot channel of the newly-installed base station from the user devices $100_n$, performs statistical processing on the reception quality measurements (e.g., calculates an average of the reception quality measurements), and sends the result of the statistical processing to the access gateway 300.

The existing base station 200 includes an RF reception unit 212, a radio resource control (RRC) protocol processing unit 214, a statistical processing unit 216, a network interface 218, and a tracking area setting unit 220.

The identifier of the newly-installed base station and the reception quality measurements of the pilot channel of the newly-installed base station are sent from the user devices $100_n$ as measurement reports. The RF reception unit 212 receives the measurement reports from the user devices $100_n$ and inputs the measurement reports to the RRC protocol processing unit 214.

The RRC protocol processing unit 214 inputs the reception quality measurements included in the measurement reports together with the cell ID of the newly-installed base station to the statistical processing unit 216 based on the RRC protocol.

The statistical processing unit 216 performs statistical processing on the input reception quality measurements. For example, the statistical processing unit 216 calculates an average of the reception quality measurements. In the example of FIG. 1, the base station $200_1$ calculates an average of reception quality measurements sent from the user devices $100_1$ and $100_2$; the base station $200_2$ uses a reception quality measurement sent from the user device $100_3$ as an average; and the base station $200_3$ uses a reception quality measurement sent from the user device $100_4$ as an average.

Figure 5:
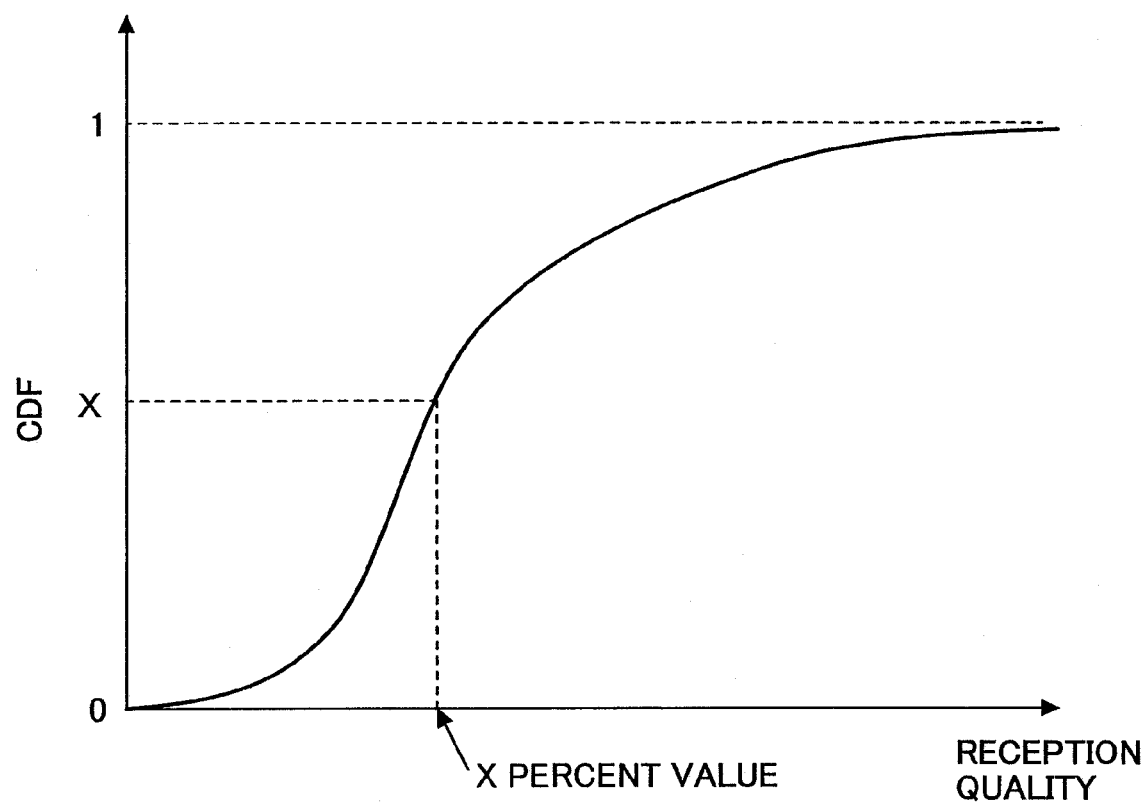
FIG. 5 is a graph showing a cumulative distribution function of reception quality measurements.

Alternatively, the statistical processing unit 212 may be configured to obtain a cumulative distribution function (CDF) of the reception quality measurements and to obtain a predetermined percent value (e.g., X percent value) of the reception quality measurements based on the cumulative distribution function as shown in FIG. 5.

The statistical processing unit 212 sends the result of statistical processing, i.e., the obtained average or percent value of the reception quality measurements together with the cell ID of the existing base station 200 to an upper node such as the access gateway 300 via the network interface 214.

Figure 6:
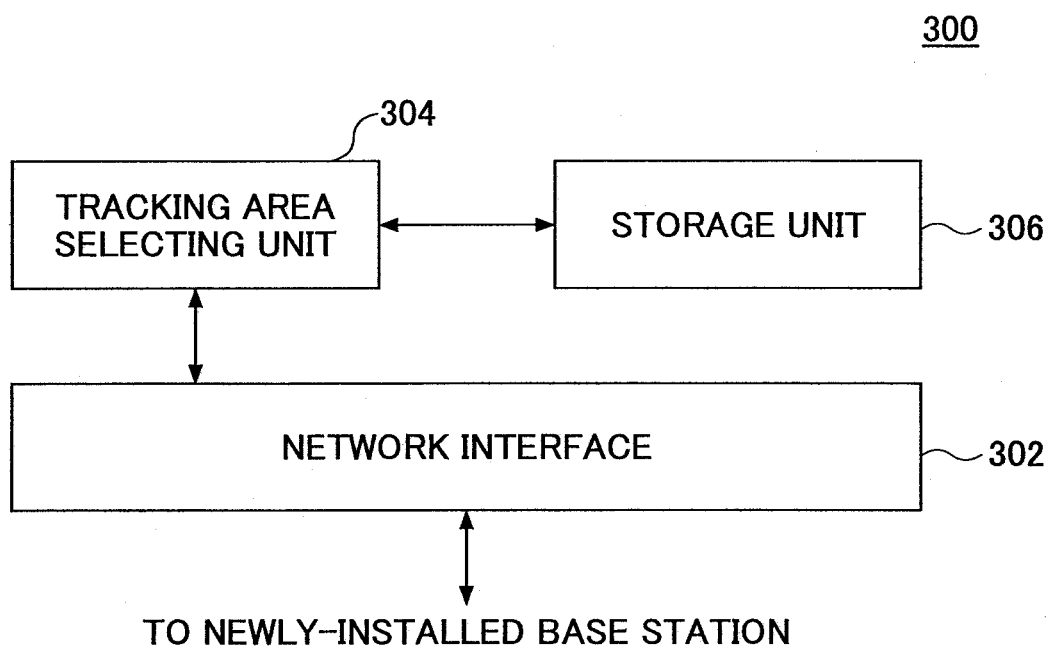
FIG. 6 is a partial block diagram of an access gateway according to an embodiment of the present invention.

Next, the access gateway 300 of this embodiment is described with reference to FIG. 6.

The access gateway 300 determines a tracking area for the newly-installed base station $200_4$ based on statistical processing results sent from the existing base stations $200_1$, $200_2$, and $200_3$, and sends information (tracking area ID) indicating the determined tracking area to the newly-installed base station $200_4$.

The access gateway 300 includes a network interface 302, a tracking area selecting unit 304, and a storage unit 306.

The network interface 302 connects the access gateway 300 to base stations including the existing base stations $200_1$, $200_2$, and $200_3$ and the newly-installed base station $200_4$, and to the HLR 400.

The storage unit 306 stores a table (hereafter called a tracking-area-and-cell mapping table) indicating the correspondence between tracking areas and their constituent cells (base stations).

The tracking area selecting unit 304 selects a tracking area for the newly-installed base station $200_4$ based on the statistical processing results sent from the existing base stations $200_1$, $200_2$, and $200_3$. For example, when averages of reception quality measurements are reported by the existing base stations $200_1$, $200_2$, and $200_3$ as the statistical processing results, the tracking area selecting unit 304 selects one of the existing base stations $200_1$, $200_2$, and $200_3$ that has reported the highest average. Then, the tracking area selecting unit 304 identifies a tracking area to which the selected existing base station belongs by referring to the tracking-area-and-cell mapping table stored in the storing unit 306 and assigns the identified tracking area to the newly-installed base station $200_4$.

Alternatively, the tracking area selecting unit 304 may be configured to identify tracking areas of existing base stations that have reported statistical processing results by referring to the tracking-area-and-cell mapping table, to calculate a total number of the existing base stations belonging to each of the tracking areas, and to assign one of the tracking areas associated with the highest total number of existing base stations to the newly-installed base station. For example, the tracking area selecting unit 304 identifies the tracking area $204_1$ of the existing base station $200_1$, the tracking area $204_1$ of the existing base station $200_2$, and the tracking area $204_2$ of the existing base station $200_3$. In this case, among the existing base stations that have reported the statistical processing results, two existing base stations $200_1$ and $200_2$ belong to the tracking area $204_1$ and one existing base station $200_3$ belongs to the tracking area $204_2$. Therefore, the tracking area selecting unit 304 selects the tracking area $204_1$ associated with the highest total number of existing base stations (two) and assigns the tracking area $204_1$ to the newly-installed base station $200_4$.

After a tracking area to be assigned to the newly-installed base station $200_4$ is selected, the tracking area selecting unit 304 sends information indicating the selected tracking area to the base station $200_4$ via the network interface 302 and updates the tracking-area-and-cell mapping table stored in the storage unit 306.

Figure 7:
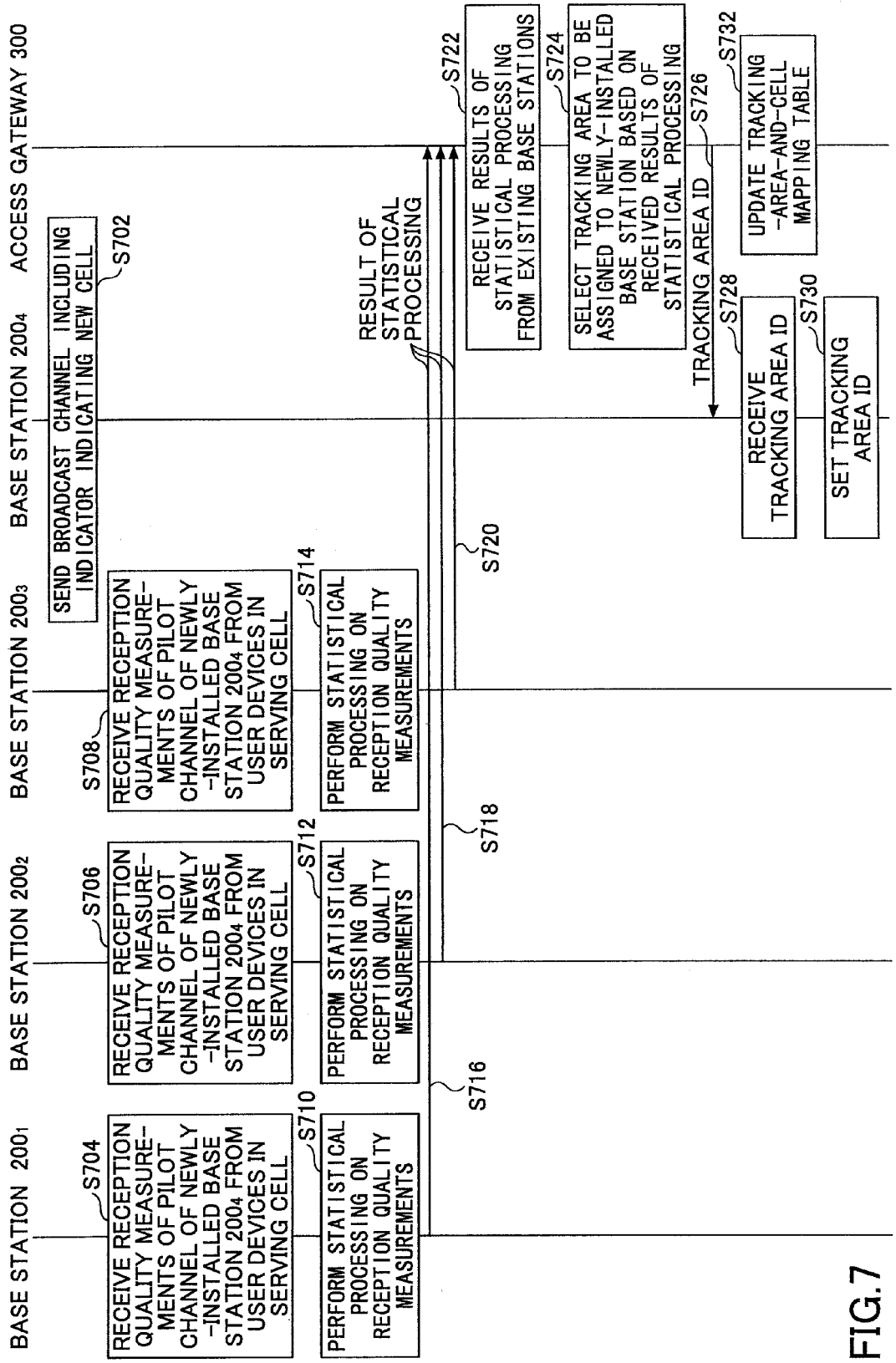
FIG. 7 is a sequence chart showing a process in a mobile communication system according to an embodiment of the present invention.

Next, an exemplary process in the mobile communication system of this embodiment is described with reference to FIG. 7.

When the base station $200_4$ is newly installed, the state setting unit 210 sets the base station $200_4$ in the pre-operation state. The broadcast channel generating unit 208 generates a broadcast channel including information, e.g., an indicator, indicating that the base station $200_4$ is in the pre-operation state, and the RF transmission unit 206 sends the broadcast channel together with the identifier of the base station $200_4$ (step S702).

The cell search unit 102 of each of the user devices $100_n$ performs a cell search at predetermined intervals, for example, every 200 ms. If a new cell is found, the cell search unit 102 detects a transmission band of a broadcast channel based on a received synchronization channel, and the broadcast channel receiving unit 104 receives a broadcast channel from the new cell based on the detected transmission band. If the received broadcast channel includes an indicator indicating the pre-operation state, the reception quality measuring unit 108 measures the reception quality of a pilot channel sent from the newly-installed base station $200_4$ (the new cell) that has sent the broadcast channel. Then, the reporting unit 110 reports the reception quality measurement obtained by the reception quality measuring unit 108 together with the identifier of the newly-installed base station $200_4$ to the corresponding existing base station covering a serving cell where the user device 100 is present.

The RF reception unit 208 of each of the existing base stations $200_1$, $200_2$, and $200_3$ covering serving cells of the user devices $100_n$ receives the identifier of the newly-installed base station and the reception quality measurements from the corresponding user devices $100_n$ (steps S704, S706, and S708). In each of the existing base stations $200_1$, $200_2$, and $200_3$, the RRC protocol processing unit 210 inputs the reception quality measurements to the statistical processing unit 212 based on the RRC protocol.

Next, the statistical processing unit 212 of each of the existing base stations $200_1$, $200_2$, and $200_3$ performs statistical processing on the input reception quality measurements (steps S710, S712, and S714).

Then, each of the existing base stations $200_1$, $200_2$, and $200_3$ sends the result of the statistical processing performed by the statistical processing unit 212 to the access gateway 300 (steps S716, S718, and S720).

The access gateway 300 receives the statistical processing results from the existing base stations $200_1$, $200_2$, and $200_3$ (step S722).

The tracking area selecting unit 304 of the access gateway 300 selects a tracking area for the newly-installed base station $200_4$ based on the received statistical processing results (step S724).

Next, the access gateway 300 sends a tracking area ID of the selected tracking area to the newly-installed base station $200_4$ (step S726).

The newly-installed base station $200_4$ receives the tracking area ID from the access gateway 300 (step S728).

Then, the tracking area setting unit 220 of the newly-installed base station $200_4$ sets the tracking area ID (step S730).

Meanwhile, the access gateway 300 that has sent the tracking area ID updates the tracking-area-and-cell mapping table stored in the storage unit 306 (step S732).

In the above embodiment, the statistical processing results are sent from the existing base stations $200_1$, $200_2$, and $200_3$ to the access gateway 300. Alternatively, in a case where an operation and maintenance (OAM) server is provided in the mobile communication system, the existing base stations $200_1$, $200_2$, and $200_3$ may be configured to send the statistical processing results to the OAM server configured to perform the steps performed by the access gateway 300 in the above embodiment. Also, the existing base stations $200_1$, $200_2$, and $200_3$ may be configured to send the statistical processing results to the newly-installed base station $200_4$ and the newly-installed base station $200_4$ may be configured to perform the steps performed by the access gateway 300 in the above embodiment. In this case, the newly-installed base station $200_4$ determines a tracking area based on the tracking-area-and-cell mapping table stored in the access gateway 300.

In the above embodiment, the newly-installed base station broadcasts an indicator indicating the pre-operation state. Alternatively, a synchronization channel pattern or a scrambling code pattern to be assigned to a newly-installed base station may be predetermined and the newly-installed base station may be configured to report that the base station is newly installed by sending a synchronization channel using the predetermined synchronization pattern or the scrambling code pattern. This configuration allows a user device to detect the newly-installed base station based on a received synchronization channel, i.e., before receiving a broadcast channel.

In the above embodiment, a user device is configured to report a reception quality measurement of a pilot channel sent from a newly-installed bas station to an existing base station. Alternatively, a user device may be configured to determine whether a reception quality measurement of a pilot channel sent from a newly-installed base station is greater than or equal to a predetermined threshold and if so, to send information, such as an ID (identifier) of the newly-installed base station, indicating that the reception quality measurement is greater than or equal to the predetermined threshold to an existing base station. The threshold may be determined, for example, base on broadcast information from the existing base station. In this case, the existing base station obtains a total number of user devices that have reported the information indicating that the reception quality measurement is greater than or equal to the threshold and sends the total number of user devices to an access gateway. The access gateway identifies an existing base station reporting the highest total number of user devices, determines a tracking area to which the existing base station reporting the highest total number of user devices belongs, and assigns the determined tracking area to the newly-installed base station. This configuration eliminates the need for user devices to report reception quality measurements and thereby makes it possible to reduce the number of bits used for reporting.

The descriptions and drawings in the above embodiments should not be construed to be limiting the present invention. A person skilled in the art may think of variations of the above embodiments from the descriptions.

In other words, the present invention may also include various embodiments not disclosed above. Therefore, the technical scope of the present invention should be determined based on proper understanding of the claims with reference to the above descriptions.

Although the present invention is described above in different embodiments, the distinctions between the embodiments are not essential for the present invention, and the embodiments may be used individually or in combination. Although specific values are used in the above descriptions to facilitate the understanding of the present invention, the values are just examples and different values may also be used unless otherwise mentioned.

The present invention is not limited to the specifically disclosed embodiments, and variations and modifications may be made without departing from the scope of the present invention. Although functional block diagrams are used to describe apparatuses in the above embodiments, the apparatuses may be implemented by hardware, software, or a combination of them.

The present international application claims priority from Japanese Patent Application No. 2007-024895 filed on Feb. 2, 2007, the entire contents of which are hereby incorporated herein by reference.

The invention claimed is:

1. A mobile communication system, comprising:
   a newly-installed base station configured to send an identifier of the newly-installed base station and a pilot channel;
   one or more existing base stations;
   one or more user devices configured to send reception quality measurements of the pilot channel to the corresponding existing base stations; and
   an upper node, wherein each of the existing base stations includes a statistical processing unit configured to perform statistical processing on the reception quality measurements sent from the corresponding user devices, and
a statistical processing result reporting unit configured to send a result of the statistical processing to the upper node;
the upper node includes a tracking area selecting unit configured to select a tracking area to be assigned to the newly-installed base station based on the results of the statistical processing sent from the existing base stations, and
a tracking area reporting unit configured to send information indicating the tracking area selected by the tracking area selecting unit to the newly-installed base station;
the newly-installed base station includes
a tracking area setting unit configured to set the tracking area of the newly-installed base station based on the information indicating the tracking area sent from the upper node,
wherein the statistical processing unit is configured to calculate an average of the reception quality measurements sent from the corresponding user devices, and
wherein the statistical processing unit is configured to obtain a cumulative distribution function of the reception quality measurements sent from the corresponding user devices and to obtain a predetermined percent value of the reception quality measurements based on the cumulative distribution function.

2. The mobile communication system as claimed in claim 1, wherein
the upper node includes a table indicating a correspondence between tracking areas and the existing base stations constituting the tracking areas; and
the tracking area selecting unit is configured to assign the newly-installed base station one of the tracking areas to which one of the existing base stations reporting the highest percent value of the reception quality measurements belongs based on the results of the statistical processing.

3. The mobile communication system as claimed in claim 1, wherein
the upper node includes a table indicating a correspondence between tracking areas and the existing base stations constituting the tracking areas; and
the tracking area selecting unit is configured to assign the newly-installed base station one of the tracking areas to which a largest number of the existing base stations reporting the results of the statistical processing belong.

4. The mobile communication system as claimed in claim 3, wherein the tracking area selecting unit is configured to assign the newly-installed base station one of the tracking areas to which a largest number of the existing base stations reporting the results of the statistical processing greater than or equal to a predetermined threshold belong.

5. A mobile communication system, comprising:
a newly-installed base station configured to send an identifier of the newly-installed base station and a pilot channel;
one or more existing base stations;
one or more user devices configured to measure reception quality of the pilot channel; and
an upper node, wherein
each of the user devices includes
a determining unit configured to determine whether the reception quality measurement of the pilot channel is greater than or equal to a predetermined threshold, and
a reporting unit configured, if the determining unit determines that the reception quality measurement of the pilot channel is greater than or equal to the threshold, to send information indicating that the reception quality measurement is greater than or equal to the threshold to a corresponding one of the existing base stations;
each of the existing base stations includes
a totaling unit configured to count a total number of the user devices reporting the information indicating that the reception quality measurement is greater than or equal to the threshold, and
a total number reporting unit configured to send the total number of the user devices counted by the totaling unit to the upper node;
the upper node includes
a tracking area selecting unit configured to select a tracking area to be assigned to the newly-installed base station based on the total numbers of the user devices sent from the existing base stations, and
a tracking area reporting unit configured to send information indicating the tracking area selected by the tracking area selecting unit to the newly-installed base station; and the newly-installed base station includes
a tracking area setting unit configured to set the tracking area of the newly-installed base station based on the information indicating the tracking area sent from the upper node.

6. The mobile communication system as claimed in claim 5, wherein the threshold is broadcast from the existing base stations.

7. The mobile communication system as claimed in claim 5, wherein
the upper node includes a table indicating a correspondence between tracking areas and the existing base stations constituting the tracking areas; and
the tracking area selecting unit is configured to assign the newly-installed base station one of the tracking areas to which one of the existing base stations reporting the highest total number of the user devices belongs.

8. An access gateway in a system including
a newly-installed base station configured to send an identifier of the newly-installed base station and a pilot channel, and
user devices configured to send reception quality measurements of the pilot channel to existing base stations,
each of the existing base stations being configured to perform statistical processing on the reception quality measurements sent from the corresponding user devices and to send a result of the statistical processing to the access gateway, the access gateway comprising:
a tracking area selecting unit configured to select a tracking area to be assigned to the newly-installed base station based on the results of the statistical processing sent from the existing base stations;
a tracking area reporting unit configured to send information indicating the tracking area selected by the tracking area selecting unit to the newly-installed base station,
wherein the statistical processing unit is configured to calculate an average of the reception quality measurements sent from the corresponding user devices, and
wherein the statistical processing unit is configured to obtain a cumulative distribution function of the reception quality measurements sent from the corresponding user devices and to obtain a predetermined percent value of the reception quality measurements based on the cumulative distribution function.

9. A tracking area setting method, comprising:
a transmitting step, performed by a newly-installed base station, of sending an identifier of the newly-installed base station and a pilot channel;
a reporting step, performed by user devices, of sending the identifier of the newly-installed base station and reception quality measurements of the pilot channel to existing base stations;

a statistical processing step, performed by the existing base stations, of performing statistical processing on the reception quality measurements sent from the corresponding user devices;

a statistical processing result reporting step, performed by the existing base stations, of sending results of the statistical processing to an upper node;

a tracking area selecting step, performed by the upper node, of selecting a tracking area to be assigned to the newly-installed base station based on the results of the statistical processing sent from the existing base stations;

a tracking area reporting step, performed by the upper node, of sending information indicating the tracking area selected in the tracking area selecting step to the newly-installed base station;

a tracking area setting step, performed by the newly-installed base station, of setting the tracking area of the newly-installed base station based on the information indicating the tracking area sent from the upper node wherein the statistical processing unit is configured to calculate an average of the reception quality measurements sent from the corresponding user devices, and wherein the statistical processing unit is configured to obtain a cumulative distribution function of the reception quality measurements sent from the corresponding user devices and to obtain a predetermined percent value of the reception quality measurements based on the cumulative distribution function.

10. A mobile communication system, comprising:

a newly-installed base station configured to send an identifier of the newly-installed base station and a pilot channel;

one or more existing base stations;

one or more user devices configured to send reception quality measurements of the pilot channel to the corresponding existing base stations; and an upper node, wherein each of the existing base stations includes a statistical processing unit configured to perform statistical processing on the reception quality measurements sent from the corresponding user devices, and a statistical processing result reporting unit configured to send a result of the statistical processing to the upper node;

the upper node includes a tracking area selecting unit configured to select a tracking area to be assigned to the newly-installed base station based on the results of the statistical processing sent from the existing base stations, and a tracking area reporting unit configured to send information indicating the tracking area selected by the tracking area selecting unit to the newly-installed base station;

the newly-installed base station includes a tracking area setting unit configured to set the tracking area of the newly-installed base station based on the information indicating the tracking area sent from the upper node, and wherein the statistical processing unit is configured to obtain a cumulative distribution function of the reception quality measurements sent from the corresponding user devices and to obtain a predetermined percent value of the reception quality measurements based on the cumulative distribution function.

11. An access gateway in a system including a newly-installed base station configured to send an identifier of the newly-installed base station and a pilot channel, and user devices configured to send reception quality measurements of the pilot channel to existing base stations, each of the existing base stations being configured to perform statistical processing on the reception quality measurements sent from the corresponding user devices and to send a result of the statistical processing to the access gateway, the access gateway comprising:

a tracking area selecting unit configured to select a tracking area to be assigned to the newly-installed base station based on the results of the statistical processing sent from the existing base stations;

a tracking area reporting unit configured to send information indicating the tracking area selected by the tracking area selecting unit to the newly-installed base station, and wherein the statistical processing unit is configured to obtain a cumulative distribution function of the reception quality measurements sent from the corresponding user devices and to obtain a predetermined percent value of the reception quality measurements based on the cumulative distribution function.

12. A tracking area setting method, comprising:

a transmitting step, performed by a newly-installed base station, of sending an identifier of the newly-installed base station and a pilot channel;

a reporting step, performed by user devices, of sending the identifier of the newly-installed base station and reception quality measurements of the pilot channel to existing base stations;

a statistical processing step, performed by the existing base stations, of performing statistical processing on the reception quality measurements sent from the corresponding user devices;

a statistical processing result reporting step, performed by the existing base stations, of sending results of the statistical processing to an upper node;

a tracking area selecting step, performed by the upper node, of selecting a tracking area to be assigned to the newly-installed base station based on the results of the statistical processing sent from the existing base stations;

a tracking area reporting step, performed by the upper node, of sending information indicating the tracking area selected in the tracking area selecting step to the newly-installed base station;

a tracking area setting step, performed by the newly-installed base station, of setting the tracking area of the newly-installed base station based on the information indicating the tracking area sent from the upper node, and wherein the statistical processing unit is configured to obtain a cumulative distribution function of the reception quality measurements sent from the corresponding user devices and to obtain a predetermined percent value of the reception quality measurements based on the cumulative distribution function.

* * * * *